Dec. 8, 1959 A. C. BERNSTEIN 2,916,563

FREE FLOATING BALL-ACTUATED SWITCH

Filed March 9, 1956

INVENTOR

ALLAN C. BERNSTEIN

BY Burgess, Dinklage & Sprung

ATTORNEY

United States Patent Office 2,916,563

Patented Dec. 8, 1959

2,916,563

FREE FLOATING BALL-ACTUATED SWITCH

Allan C. Bernstein, Kings Point, N.Y., assignor to Executone Inc., New York, N.Y., a corporation of New York Application March 9, 1956, Serial No. 570,505

9 Claims. (Cl. 179—159)

This invention relates to a free floating ball-actuated switch.

The invention more particularly relates to, and has as one of its objects, a free floating ball-actuated switch which may be used in telephone handsets, which has an extremely simple and economical construction and which is highly reliable and trouble-free in operation.

Figure 1:
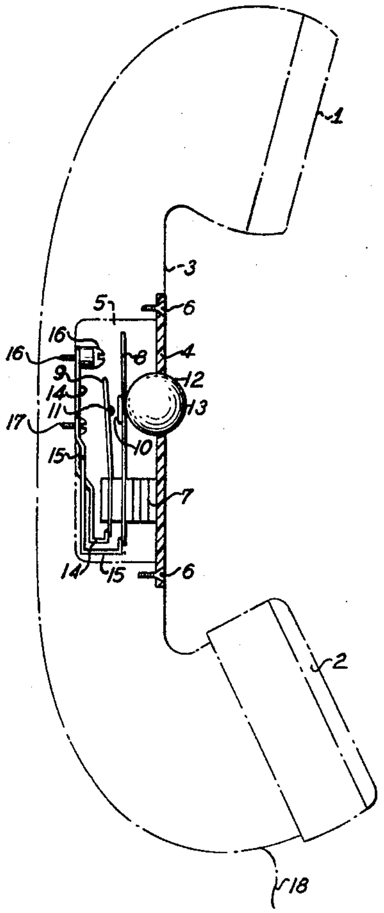
Figure 2:
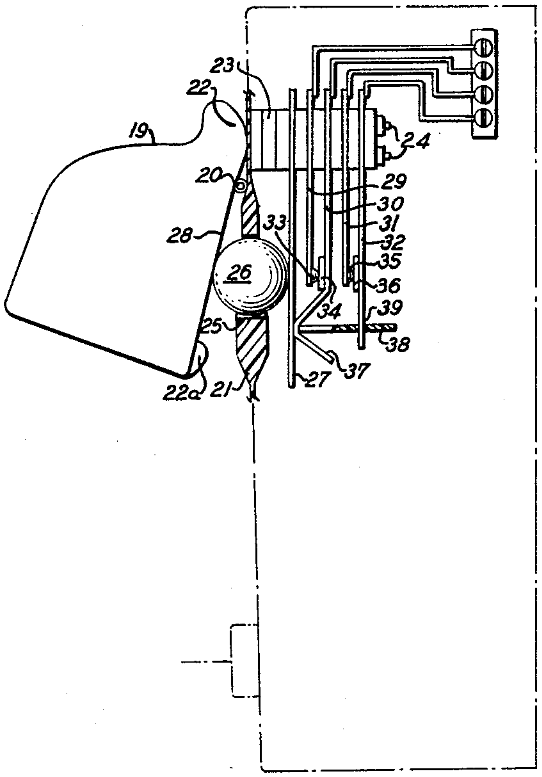

This, and still further objects, will become apparent from the following description read in conjunction with the drawings in which:

Figure 1 is a side elevation partially in section, showing an embodiment of a free floating ball-actuated switch in accordance with the invention on a communications system handset with the phone being shown in phantom view, Figure 2 is a side elevation, partially in section, showing a further embodiment of a free floating ball-actuated switch in accordance with the invention, used in conjunction with the wall or terminal box and phone cradle for the handset of Figure 1, the phone box being shown in phontom view.

The free floating ball-actuated switch in accordance with the invention has a wall, as for example in the form of a cover plate or the side wall of a phone box, which defines a hole therethrough. A ball is freely positioned with a portion thereof extending through the hole. The ball is partially movable through the hole and means are provided for maintaining the ball in substantial axial alignment with the hole, preferably by preventing movement of the ball completely through the hole in either direction. The hole is dimensioned to prevent appreciable lateral movement of the ball therein and may, for example, be somewhat smaller than the ball or, in certain embodiments, somewhat larger than the diameter of the ball. Electric contact means are positioned on one side of the wall for operating contacts upon partial movement of the ball through said hole in one direction and reverse actuating the contacts upon partial movement of the ball through the hole in the other direction. Means, such as a spring, is provided resiliently biasing the ball through said hole toward the wall side, opposite the side on which the contact means is positioned.

In the embodiment shown in the accompanying drawing, the handset for voice communication is of conventional construction and consists of the handset as shown in Figure 1 and the wall box with the phone cradle as shown in Figure 2.

The handset, as shown in Figure 1, is of the well known and conventional construction, having a handle portion 3 with an ear piece 1 at one end and a mouthpiece 2 at the other end. The ear piece contains the conventional earphone unit and the mouthpiece contains a conventional phone type microphone unit.

The handset, as is conventional in many instruments of this type, also has a finger operated "press-to-talk" switch so that when the same is held by the operator, the microphone in the mouthpiece will not be cut into the system and when the operator desires to speak he merely depresses the "press-to-talk" switch thus cutting the microphone into the communication system. The "press-to-talk" switch, if desired, can also control both the earphone and the mouthpiece.

In accordance with the invention, the finger switch for the hand phone consists of a cover plate 4 which covers a recess 5 in the handle portion of the phone. The cover plate 4 may be constructed of any desirable material as, for example, metal, plastic, vulcanite, pressed fiber or the like, and is screwed in place by means of the screws 6.

An insulating base or block 7 is secured to the cover plate 4, as for example by rivets, or the like. The insulating block may consist of individual pieces or plates of insulating material positioned one on top of the other. Secured to the base 7 are the leaf spring arms 8 and 9. These leaf spring arms may be secured between individual plates forming the base 7 with one or more of the insulating plates or another insulating spacer positioned therebetween. The leaf spring arms 8 and 9 carry the electric contacts 10 and 11 respectively which face each other and are so positioned that when the leaf spring arm 8 is bent toward the leaf spring arm 9 the contacts close. The contacts are preferably in the form of bar shaped contacts positioned at right angles with respect to each other so that when in contact they cross each other. In this manner an exact adjustment and alignment of the contacts are not necessary.

The cover plate 4 has a circular opening or hole 12 and a ball 13 is positioned behind the cover plate extending partially through the hole. The diameter of the ball 13 is slightly larger than the diameter of the hole 12 and is resiliently pressed or biased into contact with the edges of the hole by means of the leaf spring arm 8. The inside of the hole 12 is somewhat beveled so as to receive the ball snugly.

A wire 14 is secured to the end of the leaf spring arm 8 and a wire 15 is secured to the end of the leaf spring arm 9. The securing may be effected for example by soldering. The wire 14 and the wire 15 respectively are in electrical contact with the contact points 10 and 11 respectively through the conductivity of the leaf spring arms or a conductive strip lining the same, etc. The wire 14 is connected to a terminal 16 and the wire 15 is connected to a terminal 17. One of the wires necessary to complete a circuit from the hand phone to the communication system, or a circuit to a relay, may be interrupted across these terminals. The particular connection of the phone to the switch terminals, however, does not form part of the instant invention and is effected in the conventional and well known manner.

The ball 13, which may be constructed of any desirable material, and preferably an insulating material such as plastic, is freely floating and is not rigidly connected to any of the elements. The ball is maintained in a forward position merely by the pressure of the spring arm 8 forcing the same into the smaller hole 12. The ball may be freely pressed into and partially through the hole against the leaf spring arm 8 bending the same so that contacts 10 and 11 close. This closing of the contacts will be maintained so long as the ball is held in this pressed in position. The ball, the leaf spring arm 8 and/or the cover plate 4 should preferably be constructed of materials so that the ball will have a low co-efficient of friction against these other elements.

In order to prevent the ball from being pushed completely through the hole 12 and, for example, coming loose or jamming behind the cover plate 4, the same must be maintained in substantial axial alignment with the hole 12. This may be effected by providing suitable guide means to prevent substantial lateral movement of the ball out of alignment with the hole or preferably by providing stop means so that the ball can not be completely pushed through the hole.

In the embodiment as shown when the ball 13 is depressed a certain amount, the leaf spring arm 8 will contact the terminal 16 preventing further inward movement of the ball. This inward movement of the leaf spring arm 8 and the ball 13 should be so controlled by a suitable adjustment of the position of the terminal 16 that the ball will never pass below the plane of the lower edge of the hole. In other words, the distance between the leaf spring arm 8 and the inner edge of the hole 12 when the leaf spring arm 8 contacts the terminal 16 should be less than the diameter of the ball. In place of the terminal 16 any other suitable stop may be provided or the recess 5 may be dimensioned so that the leaf spring arm 8 contacts its back wall before the ball is completely pushed through the hole 12.

The hand phone is connected to the wall box as shown in Figure 2 by means of the phone wire 18 of conventional construction containing, for example, a multiple of individual leads.

The wall box is of conventional construction and contains the various connection terminals for the communication system and, for example, an audio and/or visual signal which are not shown since the same are conventional and do not form part of the instant invention.

In addition, the wall box or terminal box contains a cradle 19 on which the handset is hung in the conventional manner by the earpiece 1 when the same is not in use. The cradle 19 is pivotally mounted on the wall 21 of the box by means of a pivot joint 20 so that the same can affect a limited pivoting around this pivot joint. The degree of pivoting in an upward direction is limited to the amount shown by the upper arms 22 of the cradle striking the wall of the box. The pivoting in the opposite direction is limited by the cradle stop **22*a* striking the wall 21** of the box.

An insulating base 23 is secured to the inside of the box wall 21 by means of the nuts and screws 24. This insulating base 23 may have the same construction as the insulating base 7 in Figure 1.

The portion of the box wall 21 underneath the cradle 19 has a thickened portion with a hole or bore 25 therethrough. A ball 26 of insulating material, as for example of plastic, which has a slightly smaller diameter than the hole 25 is positioned in this hole. A leaf spring 27 secured to the base 23 resiliently urges the ball 26 in an outward direction in contact with a plate 28 forming the back of the cradle 19.

Additionally secured to the base 23 are the leaf spring arms 29 and 30 with their contacts 33 and 34 and leaf spring arms 31 and 32 with their contacts 35 and 36. The leaf spring arms normally press the contacts closed. The leaf spring arm 30 has a V bent extension 37 which extends around the forward edge of an insulating plate 38. The leaf spring arm 32 has an extension 39 which extends through and is secured to the insulating plate 38.

When the handset is hung in the cradle 19 on its earpiece 1, its weight will cause the cradle 19 to pivot downwardly forcing the ball 26 into the hole bending the leaf spring 27 in the direction away from the cradle. As the leaf spring 27 moves it forces the bent portion 37 of the spring 30 with it additionally moving the insulating plate 38 and the leaf spring arm 32. The movement of the leaf spring arms 30 and 32 opens the contacts 33 and 34 and 35 and 36 respectively. The degree of rearward movement of the ball 26 is limited by the pivotal movement of the cradle 19 so that the ball cannot be pushed completely through the hole.

Upon the hanging of the phone on the cradle with the movement of the ball 26 and the contacts in the manner described, electrical switching is performed, the function of which is not part of the subject invention. Any number of additional leaf spring arms and contacts may be connected to the base member 23 in the same manner as those shown depending on the particular circuit arrangement desired.

The contacts 33, 34, 35 and 36 may have the same construction as described in connection with the contacts 10 and 11 in Figure 1.

In order to insure that the ball 26 is retained in the hole 25 at the maximum degree of pivot of the cradle 19 in an upward direction, the distance between the rear plate 28 and the plane of the hole 25 at the point of contact with the ball should be less than the diameter of the ball 26 and should preferably be about equal to the radius of this ball.

In operation, the handset is normally hung in the cradle 19 so that the same pivots downwardly and the ball 26 moves the leaf spring 27 and the leaf spring arms 30 and 31 so that the contacts 33 and 34 and 35 and 36 are opened and the set is normally disconnected from the voice circuits of the communications system.

When it is desired to use the hand set, the hand phone is lifted from the cradle so that the spring 29 presses the ball 26 against the plate 28, pivoting the cradle in an upward direction to the position shown, permitting the switch to operate. When the operator desires to talk through the handset, he depresses the ball 13 with his finger, thus operating the switch in the handset.

The construction, as may be seen, is extremely simple and economical and, due to the free floating feature of the ball, is practically shock and damage proof. Lateral forces or blows on the switch pushing the same out of alignment can not cause any bending of the parts or any permanent damage and as soon as the forces are removed the switch will snap back to its original position. It is almost impossible to jam the switch in any position and any twisting or off centered forces merely cause an easy rolling of the ball. This is particularly desirable since when the hand phone is hung in the cradle, very often the inner surface of the handle portion is dragged along the edge of the cradle causing the switch to strike the edge of the cradle. With conventional switch constructions, this striking would tend to damage the switch. In contrast to this, with the switch in accordance with the invention, the free floating ball will merely retract and roll smoothly over the cradle edge with no possible damage.

The free-floating, ball-actuated switch in accordance with the invention permits the use of rather wide manufacturing tolerances and will permit a reasonable amount of misalignment without malfunction. In spite of the manufacturing tolerances permitted, the ball will tend to center itself axially in the hole, presenting a pleasing outward appearance and effecting a fair dust seal.

The use of the free-floating ball-actuated switch, in accordance with the invention, is, of course, not limited to handsets and cradle switches as shown, but may be used in any device requiring a switch of this type.

While the invention has been described in detail with reference to the specific embodiments shown, various changes and modifications will become apparent to the artisan which fall within the spirit of the invention and the scope of the appended claims.

I claim:

1. A free floating ball actuated switch comprising a wall defining a hole therethrough, an unattached ball freely positioned with a portion thereof extending through said hole and partially movable through said hole, means for maintaining said ball in substantial axial alignment with said hole, said hole being dimensioned to prevent appreciable lateral movement of said ball therein, a pair of leaf spring arms with opposed contacts on the end portions thereof, one of said arms being positioned in contact with said ball resiliently biasing said ball in a direction through said holes opposite said leaf spring arms, said contacts being positioned for actuation upon partial movement of said ball through said hole against said last mentioned leaf spring arm, and reverse actuation upon partial movement of said ball in said hole in the other direction.

2. A free floating ball actuated switch comprising a wall defining a hole therethrough, an unattached ball freely positioned with a portion thereof extending through said hole and partially movable through said hole, means for preventing movement of said ball completely through said hole in either direction, said hole being dimensioned to prevent appreciable lateral movement of said ball therein, a pair of leaf spring arms with opposed contacts on the end portions thereof, one of said arms being positioned in contact with said ball resiliently biasing said ball through said hole in a direction opposite said arm, said contacts being positioned for actuation upon partial movement of said ball through said hole against said last mentioned leaf spring arm and for reverse actuation upon movement of said ball through said hole in the other direction.

3. A telephone cradle switch comprising a wall defining a hole therethrough, a ball freely positioned with a portion thereof extending through said hole and partially movable through said hole, said hole being dimensioned to prevent appreciable lateral movement of said ball therein, at least two pair of leaf spring arms with each pair having opposed contacts at an end portion thereof, one of said leaf spring arms being positioned in contact with said ball resiliently biasing said ball in a direction through said hole opposite said arm, the leaf spring arm of each pair further from said ball being connected for movement with said leaf spring arm in contact with said ball, said contacts being normally closed and positioned for opening actuation when said ball is moved against said leaf spring arm in contact therewith moving the leaf spring arms connected thereto, a cradle mounted on the side of said wall opposite said leaf spring arm, said cradle being pivotably movable so that a portion thereof in contact with said ball is movable between a first position in spaced relationship to said wall at a distance less than the diameter of said ball and a second position substantially adjacent said wall whereby upon pivoting of said cradle said ball is partially moved through said hole for actuation of said contacts.

4. A ball switch, according to claim 2, in which said hole has a smaller diameter than said ball, with the center of said ball being positioned on the contact means side of said wall and in which said ball is resiliantly biased in contact with the wall edge defining said hole.

5. A ball switch, according to claim 4, in which said contacts are normally spaced apart and positioned for electrical contact when said ball is partially pushed through said hole against said last mentioned leaf spring arm.

6. A ball switch, according to claim 2, including a cradle mounted on the side of said wall opposite said leaf spring arms in contact with said ball, said cradle being pivotably movable so that the portion thereof in contact with said ball is movable between a first position in spaced relationship to said wall at a distance less than the diameter of the ball and a second position substantially adjacent said wall whereby, upon pivoting of said cradle, the ball is partially moved through said hole for actuation of said contacts.

7. A ball switch, according to claim 6, including a leaf spring and in which said electric contact means comprises at least two pair of leaf spring arms with each pair having opposed contacts at an end portion thereof, the leaf spring arm of each pair of contacts further from said ball being connected for movement with said leaf spring in contact with said ball, said contacts being normally closed and positioned for opening actuation when said ball moves against said leaf spring moving the leaf spring arms connected thereto.

8. A ball switch according to claim 7 in which said hole is slightly larger than the diameter of said ball and in which said cradle at said first position is positioned in spaced relationship to said wall at a distance of about the radius of said ball.

9. In a telephone handset having a handle with an earpiece on one end and a mouthpiece on the other and a "press-to-talk" switch mounted on the handle, the improvement in the "press-to-talk" switch which comprises an opening defined through a portion of the handle wall, a plate closing said opening, a hole defined through said plate, a ball of slightly larger diameter than said hole positioned behind said plate partially extending through said hole, a pair of leaf spring arms with opposed contacts on an end portion thereof, one of said arms being positioned in contact with said ball resiliantly biasing said ball in contact with the wall edge defining said hole, said contacts being normally spaced apart and positioned for electrical contacts when said ball is partially pushed through said hole against said leaf spring arm, and stop means positioned for contact with said leaf spring arms to prevent movement of said ball completely through said hole.

References Cited in the file of this patent

UNITED STATES PATENTS

| | | |
|---|---|---|
| 2,314,407 | Kirsten | Mar. 23, 1943 |
| 2,504,307 | Dalton | Apr. 18, 1950 |
| 2,574,887 | Pye | Nov. 13, 1950 |
| 2,684,413 | Ripple | July 20, 1954 |

FOREIGN PATENTS

| | | |
|---|---|---|
| 662,380 | Great Britain | Dec. 5, 1951 |